June 27, 1950 R. F. E. STEGEMAN 2,513,214
SEMIRIMLESS SPECTACLE
Filed Sept. 6, 1947

R.F.E. STEGEMAN
Inventor

Attorney

Patented June 27, 1950

2,513,214

UNITED STATES PATENT OFFICE 2,513,214

SEMIRIMLESS SPECTACLE

Raymond F. E. Stegeman, Greece, N. Y., assignor to Bausch & Lomb Optical Company, Rochester, N. Y., a corporation of New York Application September 6, 1947, Serial No. 772,525

4 Claims. (Cl. 88—41)

1

This invention relates to spectacle mountings and more particularly it has reference to a spectacle of the semi-rimless type wherein the lenses are detachably held by the resilience of rims which extend along the upper edges of the lenses.

One of the objects of my invention is to provide a spectacle of the type described having improved means for holding the lenses. A further object is to provide such a spectacle embodying a combined metallic and non-metallic construction. Another object is to provide a spectacle of the type described which will be neat in appearance, simple in structure and efficient in operation. These and other objects and advantages reside in certain novel features of construction, arrangement and combination of parts as will hereinafter be more fully described and pointed out in the appended claims.

Referring to the figures.

Figure 1:
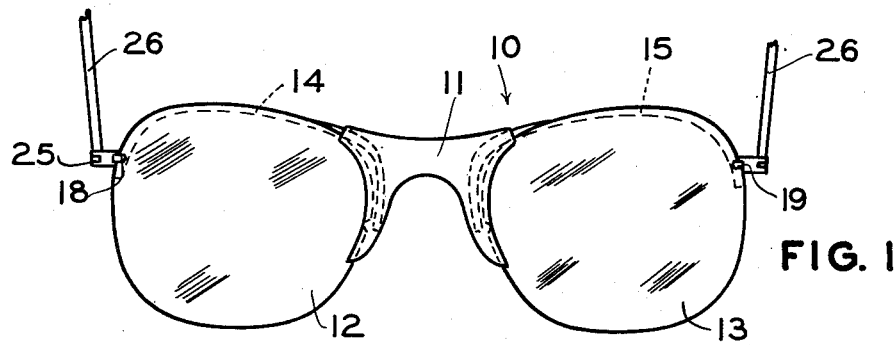
Fig. 1 is a front elevation of a spectacle embodying my invention, with the temples broken away.
Figure 2:
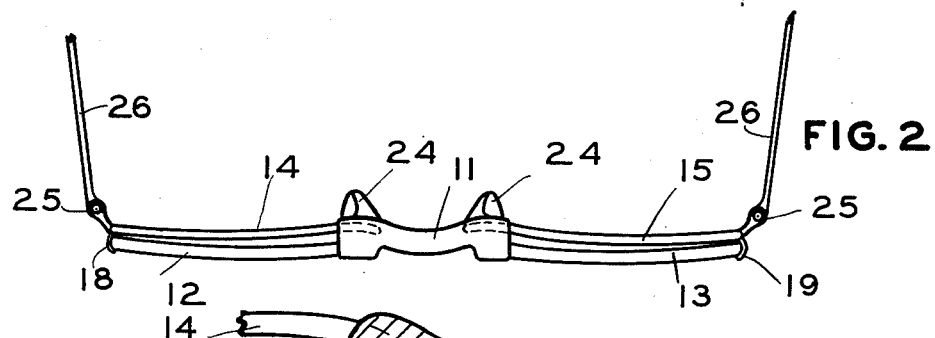
Fig. 2 is a top plan view thereof.
Figures 3, 4:
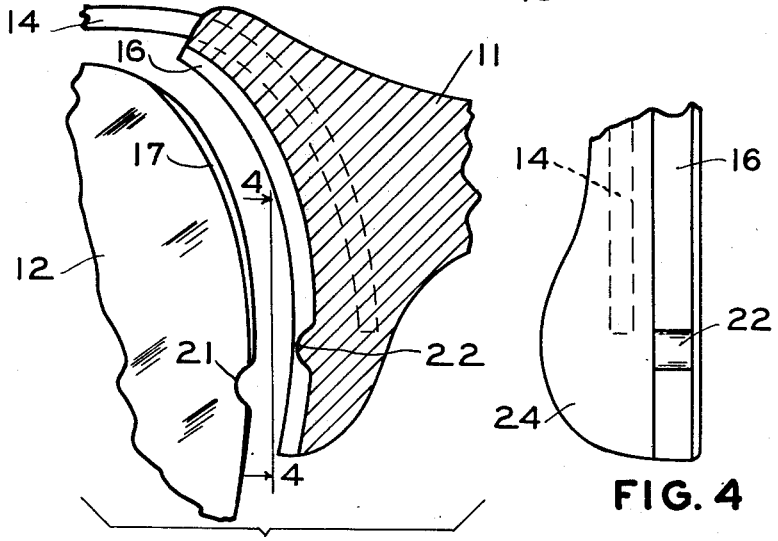
Fig. 3 is an enlarged fragmentary view, with the bridge portion in section and with the lens in disassembled relation.
Fig. 4 is a fragmentary view of the bridge portion taken in the direction of the arrows 4—4 on Fig. 3.

A preferred embodiment of my invention is disclosed in the drawing wherein 10 indicates, generally, a semi-rimless spectacle having the non-metallic bridge portion 11 positioned between the lenses 12 and 13. The resilient metallic rim members 14 and 15 extend, respectively, from the nasal sides of the bridge portion 11. The nasal end portions of the rim members 14 and 15 are secured to the non-metallic bridge portion 11 in any suitable manner such as by embedding them within the plastic material of the non-metallic bridge portion 11. The rim members 14 and 15 are positioned rearwardly of the lenses 12 and 13 and extend, respectively, along the top edges and partially down the temporal edges thereof.

Figure 5:
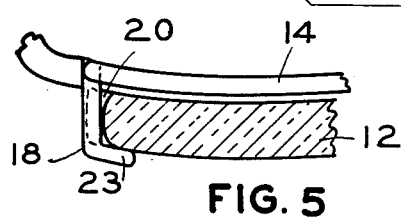
Fig. 5 is a view showing the connection of the rim member with the temporal side of the lens.

The nasal edges of the bridge portion 11 are provided with grooves 16 which receive the nasal edges of the lenses which are preferably beveled as shown at 17. The lenses are detachably held in the spactacle mounting by the resilience of the rim members 14 and 15 which have, respectively, the fingers 18 and 19 which extend forwardly therefrom. The temporal edges of the lenses are provided with notches 20 which receive the forwardly extending fingers 18 and 19. In order to more securely hold the lenses to the mounting, the nasal edges of the lenses are provided with the notches 21 so that they will receive the projections 22 which are formed within the grooves 16. The projecting ends of the fingers 18 and 19 are bent over as shown at 23 in Fig. 5 so as to engage the front surfaces of the lenses.

The bridge portion 11 carries the integrally formed pads 24 which are adapted to engage the nose of the wearer. The usual endpieces 25 are soldered to the temporal portions of the rim members 14 and 15 and pivotally carry the temples 26.

From the foregoing, it will be apparent that I am able to attain the objects of my invention and provide a semi-rimless spectacle in which the lenses are detachably secured by the resilience of the rim members which extend along the top edges of the lenses. The resilience of the rim members 14 and 15 tends to hold the fingers 18 and 19 in the temporal notches on the lenses and also urges the nasal edges of the lenses into cooperative engagement with the grooves 16 formed on the birdge portion 11. Since the fingers 18 and 19 have their free ends bent over into engagement with the front surfaces of the lenses, it is possible to accommodate lenses of varying thicknesses. A suitable bevel 17 is preferably ground on the nasal sides of the lenses so that they will be in firm coperative engagement with the grooves 16. With this construction the lenses are firmly held into the spectacle mounting and yet they may be readily detached therefrom by properly flexing the resilient rim members. While various materials may be utilized in forming my spectacle mounting, the construction lends itself very well to a combined metallic and non-metallic mounting as shown in the drawings.

Various other modifications may, obviously, be made without departing from the spirit of my invention as pointed out in the appended claims.

I claim:

1. A semi-rimless spectacle comprising a non-metallic bridge portion having grooves in its nasal sides, a pair of lenses positioned respectively with their nasal edges in said grooves, a pair of resilient metallic rim members respectively mounted rearwardly of the lenses, the nasal ends of said rim members being embedded in the bridge portion, said rim members extending along the upper edges and partially down the temporal edges of the lenses, the nasal and temporal edges of the lenses having notches formed therein, projections on the bridge portion and within the grooves, said projections engaging the notches on the nasal edges of the lenses, and fingers projecting forwardly from the temporal portions of the rim members, said fingers and projections being held in the notches on the temporal and nasal edges of the lenses by the resilience of the rim members whereby the lenses are detachably held in the spectacle.

2. In a semi-rimless spectacle, the combination of a non-metallic bridge portion having an extended groove on its nasal side, a lens having a portion of its nasal edge positioned in the groove, means for detachably holding the lens in the groove comprising a resilient metallic rim member having one end embedded in the bridge portion, said rim member positioned rearwardly of the lens and extending along the top and temporal edges thereof, and a finger projecting forwardly from the temporal portion of the rim member, said finger being positioned in a notch formed in the edge of the lens, the resilience of the rim member yieldably holding the finger in the notch and urging the edge of the lens into the groove whereby the lens is detachably held in the spectacle.

3. In a semi-rimless spectacle, the combination of a bridge, a grooved nasal portion secured to the bridge, a lens having its nasal edge positioned in the groove of said portion, a resilient rim member having one end carried by the bridge, said rim member being positioned rearwardly of the lens and extending along the top edge and partially along the temporal edge of the lens, said lens having notches on its respective nasal and temporal edges, a projection on the nasal portion and within the groove of said portion engaging the notch on the nasal edge of the lens, and a finger extending forwardly from the temporal part of said rim member, said finger engaging the notch on the temporal edge of the lens, the resilience of the rim member yieldably holding the projection and finger in the notches and urging the edge of the lens into the groove whereby the lens is detachably held in the spectacle.

4. In a semi-rimless spectacle, the combination of a non-metallic bridge portion having a groove on its nasal side, a lens having its nasal edge positioned in said groove, a resilient metallic rim member having one end embedded in the bridge portion rearwardly of the groove, said rim member extending rearwardly of and along the top and temporal edges of the lens, said lens having notches in its nasal and temporal edges, means secured to the bridge portion and positioned within said groove and other means on the temporal side of the rim member in cooperative engagement with the respective notches, the resilience of the rim member yieldably holding the means in engagement with the notches, the means on the temporal side of the rim member comprising a finger which extends forwardly and has a portion bent over to engage the front surface of the lens whereby the latter is detachably held in the spectacle.

RAYMOND F. E. STEGEMAN.

REFERENCES CITED

The following references are of record in the file of this patent:

UNITED STATES PATENTS

| Number | Name | Date |
| --- | --- | --- |
| 2,254,456 | Splaine | Sept. 2, 1941 |
| 2,254,746 | Line | Sept. 2, 1941 |
| 2,277,118 | Leavitt | Mar. 24, 1942 |
| 2,355,053 | Carlson | Aug. 8, 1944 |
| 2,357,267 | Rohrbach | Aug. 29, 1944 |
| 2,389,742 | Rey | Nov. 27, 1945 |